United States Patent
Radke et al.

(10) Patent No.: US 8,562,730 B2
(45) Date of Patent: Oct. 22, 2013

(54) INK COMPOSITION FOR INKJET PRINTING ON SUBSTRATE MATERIAL COMPRISING POLYVINYL CHLORIDE

(75) Inventors: Garold Eugene Radke, Lebanon, OR (US); Suraj Lakshman Hindagolla, Corvallis, OR (US)

(73) Assignee: ImTech Technologies LLC, Corvallis, OR (US)

( * ) Notice: Subject to any disclaimer, the term of this patent is extended or adjusted under 35 U.S.C. 154(b) by 321 days.

(21) Appl. No.: 12/932,366

(22) Filed: Feb. 24, 2011

(65) Prior Publication Data

US 2012/0219765 A1 Aug. 30, 2012

(51) Int. Cl.
*C09D 11/02* (2006.01)

(52) U.S. Cl.
USPC .............. 106/31.49; 106/31.58; 106/31.78; 106/31.86

(58) Field of Classification Search
USPC .............. 106/31.49, 31.78, 31.58, 31.86; 347/100; 427/256; 428/195.1
See application file for complete search history.

(56) References Cited

U.S. PATENT DOCUMENTS

| | | | | |
|---|---|---|---|---|
| 4,210,566 A | * | 7/1980 | Murray | 106/31.58 |
| 4,361,843 A | * | 11/1982 | Cooke et al. | 106/31.58 |
| 4,395,287 A | * | 7/1983 | Kobayashi et al. | 106/31.58 |
| 5,026,425 A | * | 6/1991 | Hindagolla et al. | 106/31.32 |
| 5,076,843 A | * | 12/1991 | Acitelli et al. | 106/31.58 |
| 5,108,503 A | * | 4/1992 | Hindagolla et al. | 106/31.49 |
| 6,087,416 A | | 7/2000 | Pearlstine | |
| 7,052,537 B2 | * | 5/2006 | Uhlir-Tsang | 106/31.49 |
| 7,682,435 B2 | * | 3/2010 | Mizutani et al. | 106/31.78 |
| 7,696,262 B2 | | 4/2010 | Cagle | |
| 7,789,955 B1 | * | 9/2010 | Gamblin et al. | 106/31.86 |
| 8,080,102 B2 | * | 12/2011 | Grant et al. | 106/31.86 |
| 8,101,012 B2 | * | 1/2012 | Grant et al. | 106/31.49 |
| 8,376,541 B2 | * | 2/2013 | Grant et al. | 347/100 |
| 2005/0101694 A1 | | 5/2005 | Elmer | |
| 2008/0132599 A1 | | 6/2008 | Nakano | |
| 2010/0271433 A1 | | 10/2010 | Jolly | |
| 2010/0328401 A1 | * | 12/2010 | Robertson et al. | 347/54 |

FOREIGN PATENT DOCUMENTS

JP 2002/114929 * 4/2002

OTHER PUBLICATIONS

English translation of JP 2002/114929, Apr. 2002.*
Data sheet on Tego Wet 270; no date available.*

* cited by examiner

*Primary Examiner* — Helene Klemanski
(74) *Attorney, Agent, or Firm* — Alleman Hall McCoy Russell & Tuttle LLP

(57) ABSTRACT

There is disclosed an ink composition and a method of printing and using ink on substrate material comprising polyvinyl chloride with thermal inkjet, drop on demand piezo inkjet, or continuous inkjet by depositing ink comprising vinyl-penetrating solvent, colorant and non-aqueous carrier solvent, the ink being free from polymerizable resins and binders.

26 Claims, No Drawings

INK COMPOSITION FOR INKJET PRINTING ON SUBSTRATE MATERIAL COMPRISING POLYVINYL CHLORIDE

BACKGROUND

The present disclosure relates generally to an inkjet ink composition used to print on substrate comprising polyvinyl chloride.

Inkjet printing produces images by depositing ink droplets on a substrate such as paper, transparent film, fabric, etc. in response to digital signals. Inkjet printing has expanded from the printing of industrial labels and desktop documents primarily on paper materials to the printing of large format media such as outdoor signs, banners, displays, posters, billboards and wraps on buses and trains.

Various types of inks and printing surfaces are available for inkjet printing. Substantially aqueous-based, inkjet ink compositions, when used in combination with non-porous/non-absorbent substrate surfaces such as those comprising polyvinyl chloride, generally suffer from long dry time and durability issues, including less than acceptable smudgefastness, colorfastness, lightfastness, waterfastness, abrasion resistance, and weather resistance. Furthermore, the primary mechanism of drying of aqueous inks on porous media is absorption. Non-porous media do not absorb. Therefore, aqueous inks do not dry well on non-porous media without assistance from dryers, etc.

In order to overcome these problems, solvent-based inks or UV-curable inks have been developed to be printed on non-absorbing substrates. Achieving the desired durability is still a challenge with such solvent-based or UV-curable inks.

DETAILED DESCRIPTION

The instant application relates to inkjet inks, specifically organic solvent-based inkjet inks for printing on substrate materials comprising polyvinyl chloride (PVC). The dry time and durability improvements are specifically manifested as at least one of: decreased dry time, increased smearfastness, increased rub resistance, increased smudgefastness, increased solvent resistance, increased colorfastness, decreased drying time, etc. This decreased dry time and increased durability can be achieved by the penetration of vinyl-penetrating solvent in the ink into the substrate material. Along with the vinyl-penetrating solvent, the ink also includes colorant and non-aqueous carrier solvent. The ink may also include surface active agent such as polyester-modified silicone or polyether-modified silicone. The ink does not include polymerizable resin or binder materials, which would otherwise react with the vinyl-penetrating solvent and interfere with its penetrating qualities, as well as with other durability qualities of the ink which result from the penetrating effectiveness of the solvent.

Therefore the instant application relates to an organic solvent-based ink composition for printing on substrate material by thermal inkjet, drop on demand piezo inkjet or continuous inkjet. The ink includes: vinyl-penetrating solvent selected from the group consisting of n-alkyl pyrrolidone, n-alkenyl pyrrolidone and combinations thereof; colorant and non-aqueous carrier solvent. Furthermore, the ink is free from polymerizable resins and/or binders.

Even though the organic solvent-based ink composition comprises non-aqueous carrier solvent and usually no added water, the ink can still function in a satisfactory manner if it picks up some water from the ambient air. In fact, the ink still prints well on substrate which comprises polyvinyl chloride even with as much as 10 weight % water. The ink prints even more optimally if there is less than 5 weight % water in the ink.

In non-limiting examples, the polymerizable resins and/or binders from which the ink is free may be one of the following: urethane oligomers as described in Nakano et al. (U.S. Patent Application Publication 2008/013259 A1) and urethane resins and thermoplastic resins as described in Elmer et al. (U.S. Patent Application Publication 2005/0101694 A1). Such polymerizable resins and/or binders from which the ink of the present application is free are in no way restricted to these specific examples.

In non-limiting examples, the vinyl-penetrating solvent is selected from the group consisting of n-vinyl pyrrolidone, n-methyl pyrrolidone, and combinations thereof.

Furthermore, in non-limiting examples, the ink includes a surface active agent, the surface active agent being selected from a group consisting of polyester-modified silicone, polyether-modified silicone and combinations thereof.

Yet furthermore, in non-limiting examples, the non-aqueous carrier solvent is selected from the group consisting of methanol, ethanol, methyl ethyl ketone, acetone, methyl acetate, ethyl acetate and combinations thereof.

Still furthermore, colorants are selected from the group consisting of solvent-based dyes, solvent-based pigments and combinations thereof. Specific non-limiting examples of the solvent-based dyes include as follows: Solvent Red 38, Solvent Red 122, Solvent Red 8, Solvent Red 49, Solvent Blue 5, Solvent Blue 70, Solvent Blue 44, Solvent Black 7, Solvent Black 5, Solvent Orange 54 and Solvent Black 29.

In an embodiment of the ink, the vinyl-penetrating solvent is from 2 to 50 weight percent, the surface active agent is from 0.1 to 5 weight percent, the colorant is from 1 to 10 weight percent, and the carrier solvent is from 10 to 90 weight percent carrier solvent.

In a further embodiment of the ink, the ink comprises from 1 to 3 weight percent colorant, from 9 to 12 weight percent n-vinyl pyrrolidone, from 0.5 to 1.5 weight percent surface active agent and from 85 to 90 weight percent methanol.

The instant application further relates to a method of printing on substrate material comprising polyvinyl chloride by thermal inkjet, drop on demand piezo inkjet, and continuous inkjet. The method includes: depositing ink on substrate material comprising polyvinyl chloride, wherein the ink comprises vinyl-penetrating solvent selected from the group consisting of n-alkyl pyrrolidone, n-alkenyl pyrrolidone and combinations thereof; colorant; and non-aqueous carrier solvent; and the ink is free from polymerizable resins and binders.

The instant application still further relates to a method of using ink comprising vinyl-penetrating solvent to print on substrate material comprising polyvinyl chloride by thermal inkjet, drop on demand piezo inkjet and continuous inkjet. The method includes: depositing the ink on a substrate material comprising polyvinyl chloride, wherein the ink comprises vinyl-penetrating solvent selected from the group consisting of n-alkyl pyrrolidone, n-alkenyl pyrrolidone and combinations thereof; colorant; and non-aqueous carrier solvent.

The instant invention further relates to recorded matter printed on substrate comprising polyvinyl chloride, the recorded matter obtained by using the ink composition described herein.

EXAMPLES

Example 1

The following components were mixed together to form ink compositions respectively with each of the colorants listed in the table below.

TABLE 1

| Component | Weight % |
| --- | --- |
| n-methyl pyrrolidone | 12 |
| Solvent Red 8, Solvent Red 38, Solvent Red 122, Solvent Red 49, Solvent Blue 5, Solvent Blue 70, Solvent Blue 44, Solvent Black 7, Solvent Black 5, Solvent Black 29 or Solvent Orange 54 | 2 |
| Polyester-modified silicone | 1 |
| Methanol | 85 |

The inks were printed on polyvinyl chloride substrate samples. Comparative inks having the same components as Example 1 except that they have 0% n-methyl pyrrolidone and 97% methanol (the additional 12% methanol to compensate for the missing n-methyl pyrrolidone) were printed on other polyvinyl chloride substrate samples. After the samples were dried and the ink had formed a dry solid layer, both samples were submitted to a scratch resistance test. This test involved scratching with a fingernail a printed layer of inkjet ink printed on a PVC substrate. According to the test, if the sample lacks scratch resistance the fingernail scratching is able to remove a layer of inkjet ink.

Equivalent samples were also submitted to a solvent resistance test by rinsing the surface of the substrates with methanol.

The solvent resistance was determined by applying methanol solvent directly to a dried, printed image on a PVC substrate sample. If directly after the application of solvent, no bleeding from the printed image was detected, then the table below indicates "yes" as to the occurrence of scratch resistance. If directly after the application of solvent, bleeding from the printed image was detected, then the table below indicates "none".

With both the scratch test and the solvent resistance test, the printed image remained permanent with the inks which include n-methyl pyrrolidone, but was completely scratched or rinsed off with the comparative inks.

Example 2

The following components were mixed together to form ink compositions respectively with each of the colorants listed in the table below. The inks were prepared and printed on polyvinyl substrate samples comprising polyvinyl chloride. Comparative inks without n-vinyl pyrrolidone but with 97 weight % solvent (the additional 10 weight % solvent to compensate for the lack of 2-vinyl pyrrolidone) were also prepared.

TABLE 2

| Component | Weight % |
| --- | --- |
| n-vinyl pyrrolidone | 10 |
| Solvent Red 38, Solvent Red 122, Solvent Red 8, Solvent Red 49, Solvent Blue 5, Solvent Blue 70, Solvent Blue 44, Solvent Black 7, Solvent Black 5, Solvent Orange 54, or Solvent Black 29 | 2 |
| Polyester-modified silicone | 1 |
| Methanol | 87 |

The same procedures and tests were performed as in Example 1. With both the scratch test and the rinse test, the printed images remained permanent with the inks which include n-vinyl pyrrolidone-containing inks, but were completely scratched or rinsed off with the comparative inks.

Example 3

Inks were prepared having the components described in Example 2 that increased or decreased the amount of n-vinyl pyrrolidone while correspondingly decreasing or increasing the amount of methanol. The samples were shown to have significant susceptibility to the scratch resistance test and the solvent resistance test only when the amount of n-vinyl pyrrolidone in the ink was decreased to 2 weight % or below. By the same token, it was only at 2 weight percent n-vinyl pyrrolidone or below that that the inks showed an increase in dry time and a susceptibility to smear.

The drying time was measured using an ink drying time recorder. The actual number of seconds, as shown in the table below, at which the samples became dried was determined with such a recorder.

The smear susceptibility was determined by pressing a human thumb down hard on a just-printed image printed by the inks on PVC substrate samples. A finding of "none" was indicated on the table below when no ink was transferred to the thumb from the printed image. A finding of "slight" was indicated on the table below when there was only a slight transfer of ink to the thumb from the printed image. A finding of "unacceptable" was indicated on the table below when there was significantly noticeable transfer of ink to the thumb from the printed image.

Scratch resistance and solvent resistance were determined as described in Example 1.

TABLE 3

| % NVP | Dry time | Smear | Solvent resistance | Scratch resistance |
| --- | --- | --- | --- | --- |
| 0 | >30 s | Unacceptable | None | None |
| 1 | >30 s | Unacceptable | None | None |
| 2 | 15 s | Slight | Slight | Yes |
| 6 | 10 s | None | Yes | Yes |
| 10 | 10 s | None | Yes | Yes |
| 14 | 10 s | None | Yes | Yes |
| 20 | 10 s | None | Yes | Yes |

While several embodiments have been described in detail, it will be apparent to those skilled in the art that the disclosed embodiments may be modified. Therefore, the foregoing description is to be considered exemplary rather than limiting.

What is claimed is:

1. An organic solvent-based ink composition for printing on substrate material comprising polyvinyl chloride, the printing being done by thermal inkjet, drop on demand piezo inkjet, or continuous inkjet, the ink comprising:
    less than 20 weight percent n-vinyl pyrrolidone in combination with greater than 80 weight percent to 90 weight percent methanol, ethanol, methyl ethyl ketone, acetone, methyl acetate, ethyl acetate, or any combination thereof; and
    colorant; and
    the ink being free from polymerizable resins and binders.
2. The ink of claim 1, wherein the ink comprises 2 to 12 weight percent n-vinyl pyrrolidone.
3. The ink of claim 1, further comprising a surface active agent selected from the group consisting of polyester-modified silicone, polyether-modified silicone and combinations thereof.
4. The ink of claim 1, wherein the colorant comprises one or more of non-aqueous solvent-based dyes and non-aqueous solvent-based pigments and combinations thereof.

5. The ink of claim 4, wherein the non-aqueous solvent-based dyes are selected from the group consisting of Solvent Red 38, Solvent Red 122, Solvent Red 8, Solvent Red 49, Solvent Blue 5, Solvent Blue 70, Solvent Blue 44, Solvent Black 7, Solvent Black 5, Solvent Orange 54, Solvent Black 29 and combinations thereof.

6. The ink of claim 3, wherein the ink comprises from 2 to 12 weight percent n-vinyl pyrrolidone, from 0.1 to 5 weight percent surface active agent, and from 1 to 10 weight percent colorant.

7. The ink of claim 3, wherein the ink comprises from 1 to 3 weight percent colorant, from 9 to 12 weight percent n-vinyl pyrrolidone, and from 0.5 to 1.5 weight percent surface active agent.

8. A method of printing on substrate material comprising polyvinyl chloride, the printing being done by thermal inkjet, drop on demand piezo inkjet, or continuous inkjet, the method comprising:
depositing organic solvent-based ink on the polyvinyl chloride, wherein the ink comprises less than 20 weight percent n-vinyl pyrrolidone in combination with 80 to 90 weight percent methanol, ethanol, or a combination thereof, and colorant, and the ink being free from polymerizable resins and binders.

9. The method of claim 8, wherein the ink comprises from 2 to 12 weight percent n-vinyl pyrrolidone.

10. The method of claim 8, wherein the ink further comprises a surface active agent selected from the group consisting of polyester-modified silicone, polyether-modified silicone and combinations thereof.

11. The method of claim 8, wherein the colorant is selected from the group consisting of non-aqueous solvent-based dyes, non-aqueous solvent-based pigments and combinations thereof.

12. The method of claim 11, wherein the non-aqueous solvent-based dyes are selected from the group consisting of Solvent Red 38, Solvent Red 122, Solvent Red 8, Solvent Red 49, Solvent Blue 5, Solvent Blue 70, Solvent Blue 44, Solvent Black 7, Solvent Black 5, Solvent Orange 54, Solvent Black 29 and combinations thereof.

13. The method of claim 10, wherein the ink comprises from 2 to 12 weight percent n vinyl pyrrolidone, from 0.1 to 5 weight percent surface active agent, and from 1 to 10 weight percent colorant.

14. The method of claim 10, wherein the ink comprises from 1 to 3 weight percent colorant, from 9 to 12 weight percent n-vinyl pyrrolidone, and from 0.5 to 1.5 weight percent surface active agent.

15. A method of utilizing organic solvent-based ink comprising vinyl-penetrating solvent to print on substrate material comprising polyvinyl chloride, the printing being done by thermal inkjet, drop on demand piezo inkjet, or continuous inkjet, the method comprising:
depositing the ink on the polyvinyl chloride, wherein the ink comprises less than 20 weight percent n-vinyl pyrrolidone in combination with 80 to 90 weight percent methanol, ethanol, or a combination thereof, and colorant.

16. The method of claim 15, wherein the ink comprises 2 to 12 weight percent n-vinyl pyrrolidone.

17. The method of claim 15, wherein the ink further comprises a surface active agent selected from the group consisting of polyester-modified silicone, polyether-modified silicone and combinations thereof.

18. The method of claim 15, wherein the colorant is selected from the group consisting of non-aqueous solvent-based dyes, non-aqueous solvent-based pigments and combinations thereof.

19. The method of claim 18 wherein the non-aqueous solvent-based dyes are selected from the group consisting of Solvent Red 38, Solvent Red 122, Solvent Red 8, Solvent Red 49, Solvent Blue 5, Solvent Blue 70, Solvent Blue 44, Solvent Black 7, Solvent Black 5, Solvent Orange 54, Solvent Black 29 and combinations thereof.

20. The method of claim 17, wherein the ink comprises from 2 to 12 weight percent n-vinyl pyrrolidone, from 0.1 to 5 weight percent surface active agent, and from 1 to 10 weight percent colorant.

21. The method of claim 17, wherein the ink comprises from 1 to 3 weight percent colorant, from 9 to 12 weight percent n-vinyl pyrrolidone, and from 0.5 to 1.5 weight percent surface active agent.

22. The method of claim 15, wherein the ink is free of polymerizable resins and binders.

23. Recorded matter printed on a substrate comprising polyvinyl chloride utilizing the ink composition as claimed in claim 1.

24. The ink of claim 1, wherein the ink comprises less than 20 weight percent n-vinyl pyrrolidone in combination with 80 to 90 weight percent methanol.

25. The method of claim 8, wherein the ink comprises less than 20 weight percent n-vinyl pyrrolidone in combination with 80 to 90 weight percent methanol.

26. The method of claim 15, wherein the ink comprises less than 20 weight percent n-vinyl pyrrolidone in combination with 80 to 90 weight percent methanol.

* * * * *